US006859417B1

(12) United States Patent
Houg

(10) Patent No.: US 6,859,417 B1
(45) Date of Patent: Feb. 22, 2005

(54) RANGE FINDING AUDIO SYSTEM

(75) Inventor: Todd C. Houg, St. Francis, MN (US)

(73) Assignee: Micron Technology, Inc., Boise, ID (US)

( * ) Notice: Subject to any disclaimer, the term of this patent is extended or adjusted under 35 U.S.C. 154(b) by 541 days.

(21) Appl. No.: 09/306,954

(22) Filed: May 7, 1999

(51) Int. Cl.[7] .................................................. G01S 15/00
(52) U.S. Cl. .............................. 367/96; 367/95; 381/79
(58) Field of Search ....................... 367/95, 96; 381/77, 381/79, 103, 300, 303, 310, 311, 101, 102

(56) References Cited

U.S. PATENT DOCUMENTS 4,586,195 A * 4/1986 DeGeorge et al. ............ 367/96
5,129,004 A * 7/1992 Imai et al. .................... 381/86
5,255,326 A * 10/1993 Stevenson ................... 381/110
5,499,294 A * 3/1996 Friedman ..................... 380/10

FOREIGN PATENT DOCUMENTS

JP 10-126900 * 5/1998

* cited by examiner

*Primary Examiner*—Ian J. Lobo
(74) *Attorney, Agent, or Firm*—Trop, Pruner & Hu, P.C.

(57) ABSTRACT

A range finding audio system automatically modifies the audio output of an audio source based on the distance of a listener from the speakers. A speaker in an audio system may include a range device coupled with a controller. The range device may utilize infrared, laser, or acoustic technology to determine the distance between the speaker and the listener. The controller may transfer distance information to an audio interface of a processor unit. The audio interface may include a positioning routine to modify the audio output according to the distance from the speaker to the listener. Alternatively, the controller may perform the functions ascribed to the positioning routine making the necessary modifications to the audio output based on the distance information.

26 Claims, 2 Drawing Sheets

RANGE FINDING AUDIO SYSTEM

BACKGROUND

The invention relates generally to audio systems, and more particularly to audio systems with range finding devices. In the past few years, audio system quality has improved rapidly due to several technological advancements. New media such as compact discs allow for higher quality audio recordings. The designs of speakers have also been modified to enhance both sound clarity and quality. Additionally, advances in digital technology have made dramatic improvements in audio quality. Today, many computer users emphasize audio technology as an important factor in purchasing a computer system. Therefore, computer companies have swiftly incorporated some advances in audio technology into their computer systems. Advances in audio technology such as three dimensional (3D) audio have also greatly affected the computer game industry. Three dimensional audio systems construct audio output signals that enable the listener to perceive a three dimensional sound field around them. By replicating the audio cues that people use to determine sound location and intensity, the listener may hear audio signals that appear to be generated by sound sources located at different places in the three dimensional sound field.

These advanced audio technologies are very effective if the listener is stationary at the audio focal point of the system. An audio system may have an audio focal point at a location where the balance of the sound from each of the speakers may be approximately equal. However, if a listener moves away from the audio focal point, the listener's perception of the sound quality may degrade. To overcome this, a user may manually adjust the balance of the audio system's speakers or manually adjust the location of the speakers. Actions such as these may interrupt a listener during the course of using an audio system or computer system.

Thus, it would be beneficial to provide a method for automatically modifying the audio output of an audio system based on a change in position of the listener.

SUMMARY

The invention provides an audio system including a range device coupled to a plurality of speakers. The range device may aid in determining the distance to an object. The audio system may also include a positioning routine to modify the audio output based on the distance information. In one embodiment, the invention provides a method to automatically modify the audio output signal upon a detected change in position of an object. In another embodiment, the invention may include receiving indications of the distances from speakers to an object and, based on the distance indications, modify the audio output.

DETAILED DESCRIPTION

Techniques (including methods and devices) are described to construct an audio system that utilizes a range device incorporated in a speaker to automatically adjust the audio output signals upon the detected movement of an object, e.g. the listener. The following embodiments of this invention are illustrative only and are not to be considered limiting in any respect.

Figure 1:
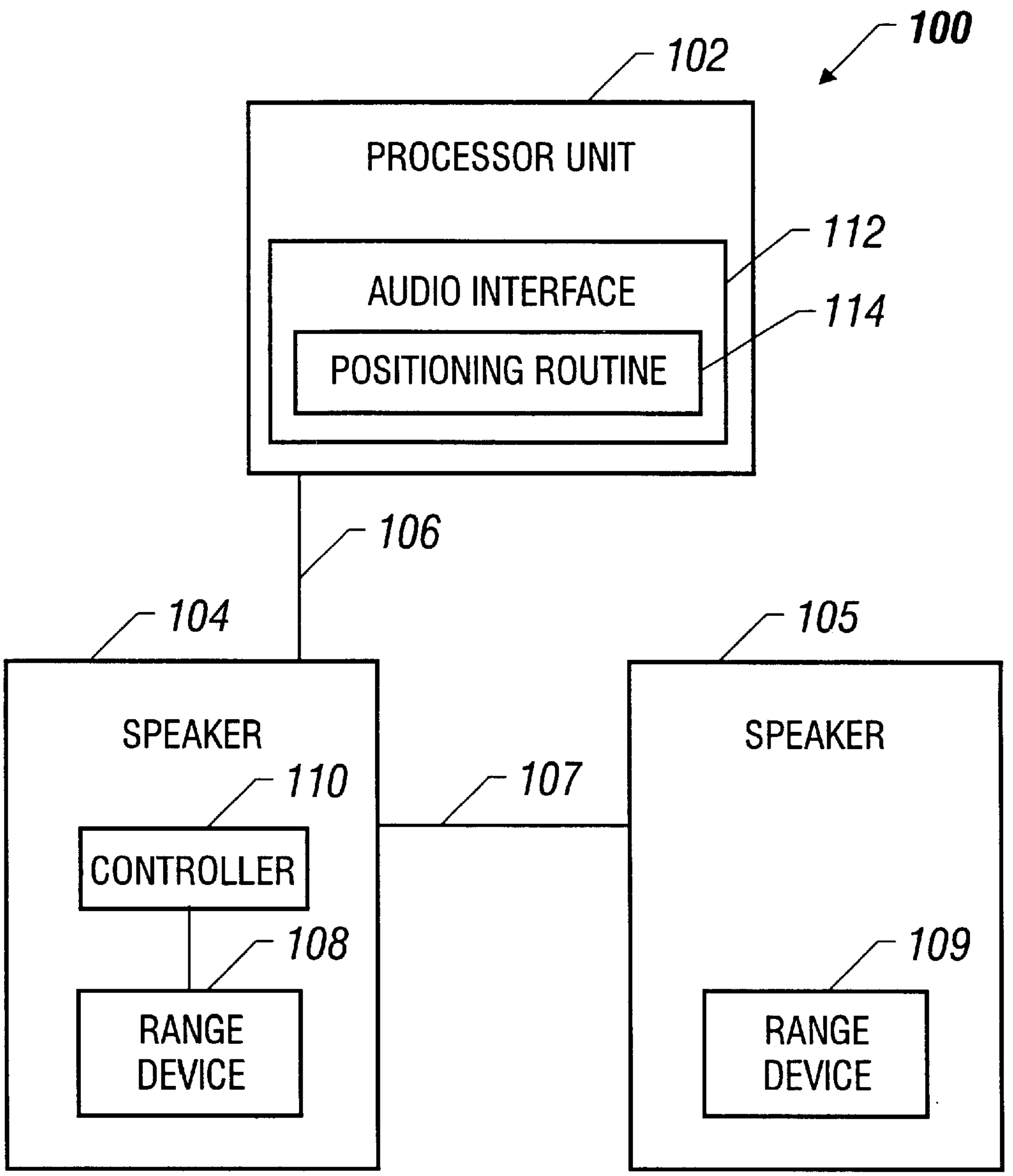
FIG. 1 shows an illustrative audio system with a range finding speaker system.

Referring to FIG. 1, one embodiment of an illustrative audio system 100 may include a processor unit 102. For example, a processor unit 102 may be the central processing unit of a computer system. Alternatively, the processor unit 102 may be a microprocessor or microcontroller incorporated in a stereo system. In some embodiments, the audio system 100 may include two speakers. In other embodiments, the audio system 100 may include a plurality of speakers, as in a surround sound system. The processor unit 102 may include an audio interface 112 that sends audio output signals to speakers 104 and 105. The audio output signals may be sent to speaker 104 via communication link 106 and then to speaker 105 via communication link 107. The communication links 106 and 107 may utilize cable or wireless technologies such as radio frequency (RF) or infrared (IR).

Speaker 104 may include a range device 108 coupled with a controller 110. A range device 108 may aid in determining the distance from the listener to the speaker 104 at a particular time. Another speaker 105 may also include a range device 109 to determine the distance from speaker 105 to the listener. A range device 109 in speaker 105 may then transfer the distance data to the controller 110 in the speaker 104 via the communication link 107. The distance data from both speakers 104 and 105 may be transferred to the audio interface 112 of the processor unit 102 via the communication link 106. An audio interface 112 may include a positioning routine 114 which may modify the audio output to speakers 104 and 105 based on the distance information. The positioning routine 114 may adjust the balance of the audio output by attenuating the power output to the speakers. In accordance with another embodiment, audio system 100 may be a three dimensional (3D) audio system which simulates a three dimensional field of sound around the listener. A 3D audio system may include sound sources arranged in the three dimensional field of sound such that the listener perceives the sounds at a precise time and volume level. Each sound source may be represented by a separate component of the audio output signal. In order to preserve the timing and intensity of the 3D audio output, the audio system 100 may modify the audio output signals based upon a detected change in position of the listener. In this embodiment, the positioning routine 114 may modify the timing of audio signals to speakers 104 and 105 to maintain a 3D audio field where the listener is kept at the audio focal point.

Figure 2:
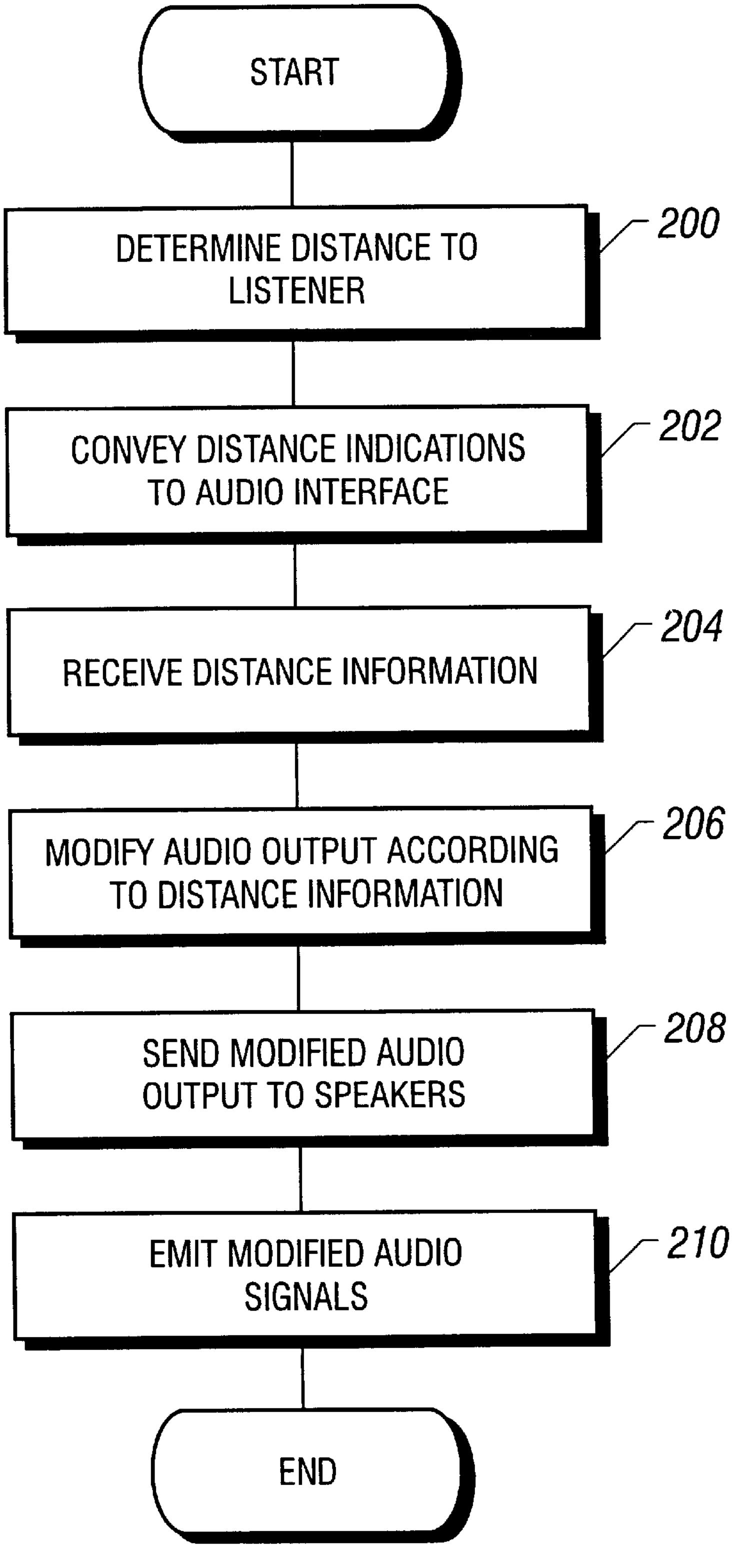
FIG. 2 shows a flow diagram for a range finding speaker system.

According to some embodiments, range devices 108 and 109 may be any type of device capable of determining the distance to an object. Illustrative range devices may include infrared, laser, or acoustic technology to provide indications of the distance to an object. Referring to FIG. 2, in one embodiment the range device 108 of a speaker 104 may determine the distance to the nearest object, e.g., the listener, within the line of the audio output, as in block 200. Additionally, range device 109 of speaker 105 may determine the distance between speaker 105 and the listener. Then, the range devices 108 and 109 may convey indications of the distance information to the audio interface 112 of the processor unit 102 via communication links 106 and 107, as shown in block 202. At block 204, the positioning routine 114 receives the distance information. The positioning routine 114 may modify an audio output signal in accordance with the distance of the listener from the speakers 104 and 105, as shown in block 206. The audio balance of the system may be modified to maintain the balance perceived by the listener at their previous position. In another embodiment, the timing of the audio output signals may be modified based on the distance information to maintain a three dimensional audio field where the listener is kept at the audio focal point. Next, at block 208, the audio interface 112 may transmit the modified audio signals to the speakers 104 and 105 via the communication links 106 and 107. The speakers 104 and 105 may then emit the modified audio signals as sounds for the listener to hear, as shown in block 210.

In accordance with one embodiment of the invention, an audio interface 112 may generate an interrupt at a regular interval to provide the positioning routine 114 with updated distance information. Alternatively, an audio interface 112 may generate an interrupt when the position of the listener changes more than a specified amount. In accordance with another embodiment of the invention, the audio interface 114 may include registers for storing the distance information from the range devices 108 and 109. The positioning routine 114 may poll the registers in the audio interface 112 for changes in the distance information.

In another embodiment, after range devices 108 and 109 determine the distances from the speakers to the listener, the controller 110 may modify the audio output signals. Instead of transferring the distance information to the audio interface 112, the controller 110 may adjust the power or the three dimensional balance of the audio output signals. In one embodiment, the controller 110 may modify the audio output signals each time new distance information is obtained by the range devices 108 and 109. In accordance with another embodiment, the controller 110 may modify the audio output signals at a regular interval (e.g., once every two seconds) based on the distance information.

Various changes in the materials, components, circuit elements, as well as in the details of the illustrated operational method are possible without departing from the scope of the claims. For instance, acts in accordance with FIG. 2 may be performed by a programmable control device executing instructions organized into a program module (e.g., positioning routine 114). A programmable control device may be a single computer processor (e.g., processor unit 102), a plurality of computer processors coupled by a communications link, a microcontroller, a digital signal processor, or a custom designed state machine (e.g., controller 110). Custom designed state machines may be embodied in a hardware device such as a printed circuit board comprising discrete logic, integrated circuits, specially designed application specific integrated circuits (ASICs), or field programmable gate array devices. Storage devices suitable for tangibly embodying program instructions include all forms of non-volatile memory including, but not limited to: semiconductor memory devices such as EPROM, EEPROM, and flash devices; magnetic disks (fixed, floppy, and removable); other magnetic media such as tape; and optical media such as CD-ROM disks.

While the invention has been disclosed with respect to a limited number of embodiments, numerous modifications and variations will be appreciated by those skilled in the art. It is intended, therefore, that the following claims cover all such modifications and variations that may fall within the true spirit and scope of the invention.

What is claimed is:

1. An audio system comprising:

a plurality of speakers;

a first range device coupled to a first speaker and a second range device coupled to a second speaker, the first range device adapted to generate a first indication representing a first distance to a listener, the second range device adapted to generate a second indication representing a second distance to the listener; and a positioning routine executed by a processor unit and operatively coupled to the plurality of speakers and to the first and second range devices, the positioning routine adapted to modify a timing of an audio signal transmitted to the plurality of speakers based on the first and second indications.

2. The audio system of claim 1, wherein the plurality of speakers comprises two speakers.

3. The audio system of claim 1, wherein the plurality of speakers comprises five speakers.

4. The audio system of claim 1, wherein the processor unit comprises a central processing unit of a computer system.

5. The audio system of claim 1, wherein the processor unit comprises a microprocessor included in a stereo system.

6. The audio system of claim 1, wherein the processor unit comprises a digital signal processor.

7. The audio system of claim 1, wherein the range device comprises an infrared range device.

8. The audio system of claim 1, wherein the range device comprises an acoustic range device.

9. The audio system of claim 1, wherein the range device comprises a laser range device.

10. The audio system of claim 1, wherein the first and second range devices are incorporated in speaker housings.

11. The audio system of claim 1, wherein the first and second range devices are adapted to change respective first and second indications as the listener moves, the positioning routine adapted to further modify the timing of the audio signal in response to changes in the first and second indications.

12. A method to adjust audio output, comprising:

receiving a first signal representing a first distance to a listener;

receiving a second signal representing a second distance to the listener; and modifying a timing of the audio output signal based on the first and second signals.

13. The method of claim 12, wherein the act of modifying the audio output signal further comprises modifying the power output to at least one speaker.

14. The method of claim 12, wherein the act of modifying the audio output signal comprises adjusting the timing and an intensity of at least one audio signal component to approximate a three dimensional audio field.

15. The method of claim 12, further comprising:

receiving modified first and second signals in response to the listener moving, wherein modifying the timing of the audio output signal is further based on the modified first and second signals.

16. A method to adjust an audio output signal, comprising:

obtaining a first distance from a first range device to a listener;

obtaining a second distance from a second range device to the listener; and modifying an intensity and at least another component of the audio output signal based on the first and second distances.

17. The method of claim 16, wherein the act of modifying the intensity of the audio output signal comprises modifying the power output to at least one speaker.

18. The method of claim 16, wherein the act of modifying the intensity and another component of the audio output signal comprises adjusting the intensity and a timing of at least one audio signal component to approximate a three dimensional audio field.

19. The method of claim 16, wherein obtaining the first distance and obtaining the second distance are performed as the listener is moving.

20. The method of claim 19, wherein the act of modifying the intensity and another component of the audio output signal comprises adjusting the intensity and a timing of at least one audio signal component.

21. An audio system comprising:

at least one speaker;

at least one range device for acquiring range data of a listener relative to the speaker; and a processing unit adapted to process the range data and modify a timing and an intensity of an audio output signal transmitted by the speaker in response to processing the range data.

22. The audio system of claim 21, wherein the processing unit comprises a digital signal processor.

23. The audio system of claim 21, wherein the processing unit comprises a controller capable of executing a computer software program.

24. The audio system of claim 21, wherein the processing unit capable of modifying at least one component of an audio output signal further comprises the processing unit being capable of modifying the timing and intensity of the audio output signal to produce a three-dimensional sound.

25. The audio system of claim 21, wherein the range device comprises at least one of an infrared range device, an acoustic range device, and a laser range device.

26. The audio system of claim 21, wherein the at least one range device is adapted to acquire different range data in response to the listener moving.

* * * * *